May 27, 1952 H. M. SADWITH 2,598,074
WASHING MACHINE FOR BAKING UTENSILS
Filed Aug. 31, 1946 5 Sheets-Sheet 1

INVENTOR.
Howard M. Sadwith
BY
Kenyon & Kenyon
ATTORNEYS

May 27, 1952 H. M. SADWITH 2,598,074
WASHING MACHINE FOR BAKING UTENSILS
Filed Aug. 31, 1946 5 Sheets-Sheet 3

INVENTOR.
Howard M. Sadwith
BY
Kenyon & Kenyon
ATTORNEYS

May 27, 1952  H. M. SADWITH  2,598,074
WASHING MACHINE FOR BAKING UTENSILS
Filed Aug. 31, 1946  5 Sheets-Sheet 4
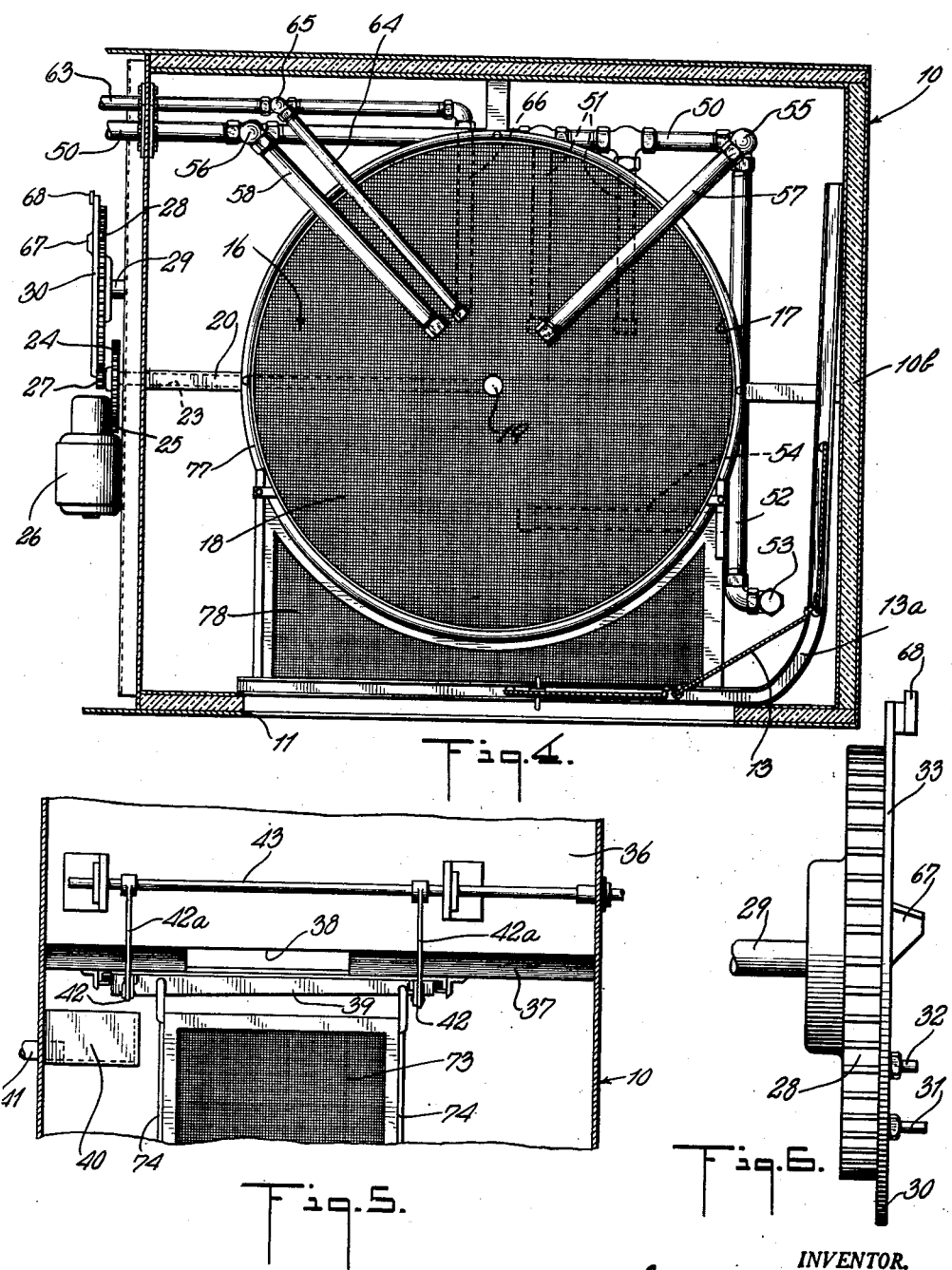

May 27, 1952 H. M. SADWITH 2,598,074
WASHING MACHINE FOR BAKING UTENSILS
Filed Aug. 31, 1946 5 Sheets-Sheet 5
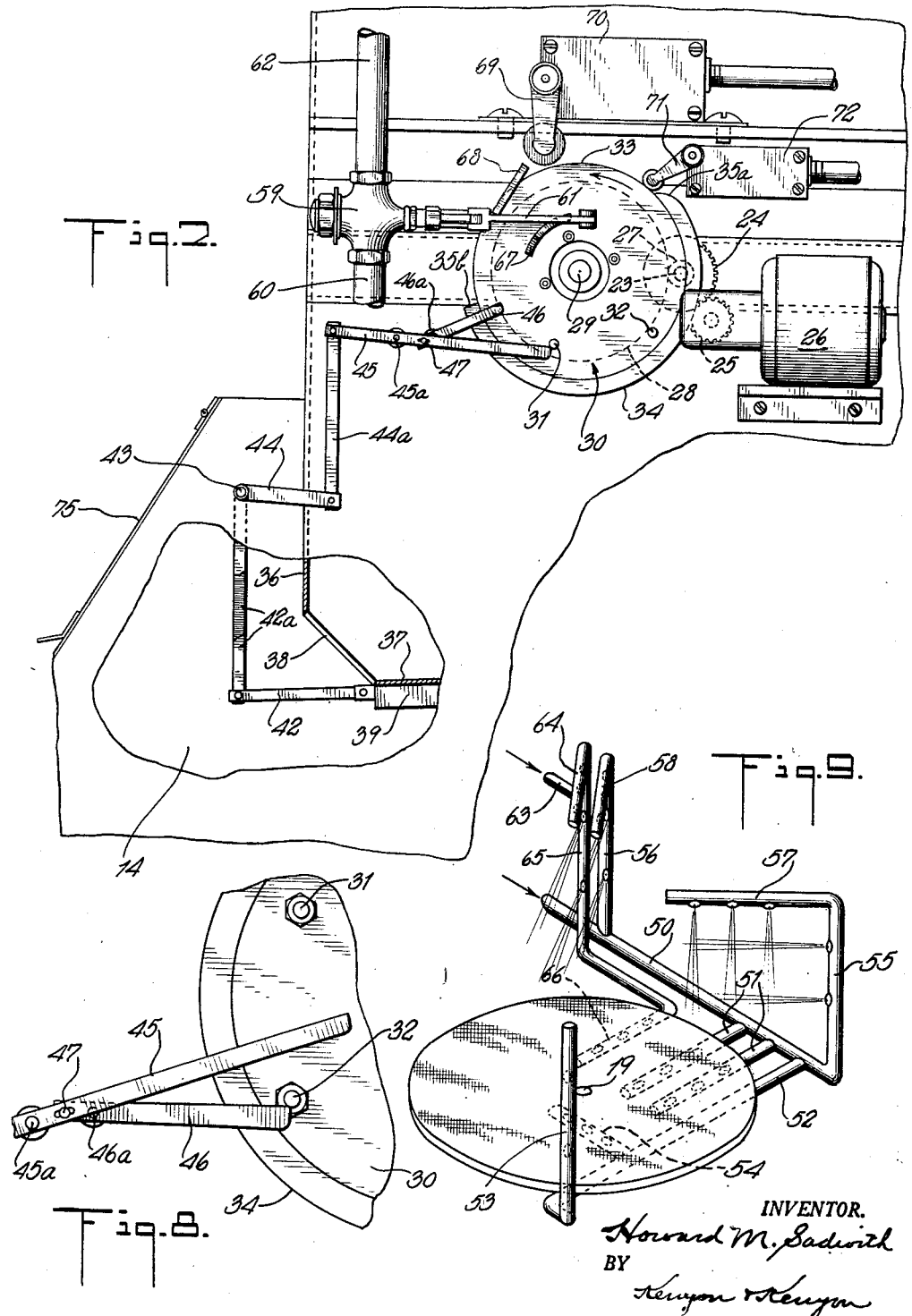
INVENTOR.
Howard M. Sadwith
BY
Kenyon & Kenyon
ATTORNEYS Patented May 27, 1952

2,598,074

UNITED STATES PATENT OFFICE 2,598,074

WASHING MACHINE FOR BAKING UTENSILS

Howard M. Sadwith, Plainfield, N. J., assignor to Industrial Washing Machine Corporation, New Brunswick, N. J., a corporation of New Jersey Application August 31, 1946, Serial No. 694,278

4 Claims. (Cl. 134—95)

This invention relates to washing machines and more especially to washing machines for industrial uses such, for example, as cleaning bread, cake and pie-baking tins and other utensils used in a commercial bakery.

An object of this invention is an inexpensive compact and sanitary unit for quickly and efficiently washing and rinsing utensils of various character.

A further object of this invention is a fully automatic machine which washes and rinses articles without operator assistance other than to load and unload the machine with the unwashed and cleansed articles.

Other objects, novel features and advantages of this invention will become apparent from the following specification and accompanying drawings, wherein:

Fig. 4 is a horizontal section substantially on the line 4—4 of Fig. 3;

Fig. 5 is a fragmentary section on the line 5—5 of Fig. 2;

Fig. 6 is an elevation of a detail;

Fig. 7 is a fragmentary side elevation partially broken away;

Fig. 8 is a view similar to Fig. 7 illustrating a different arrangement of certain parts, and Fig. 9 is a perspective view of the spray pipes.

Figure 1:
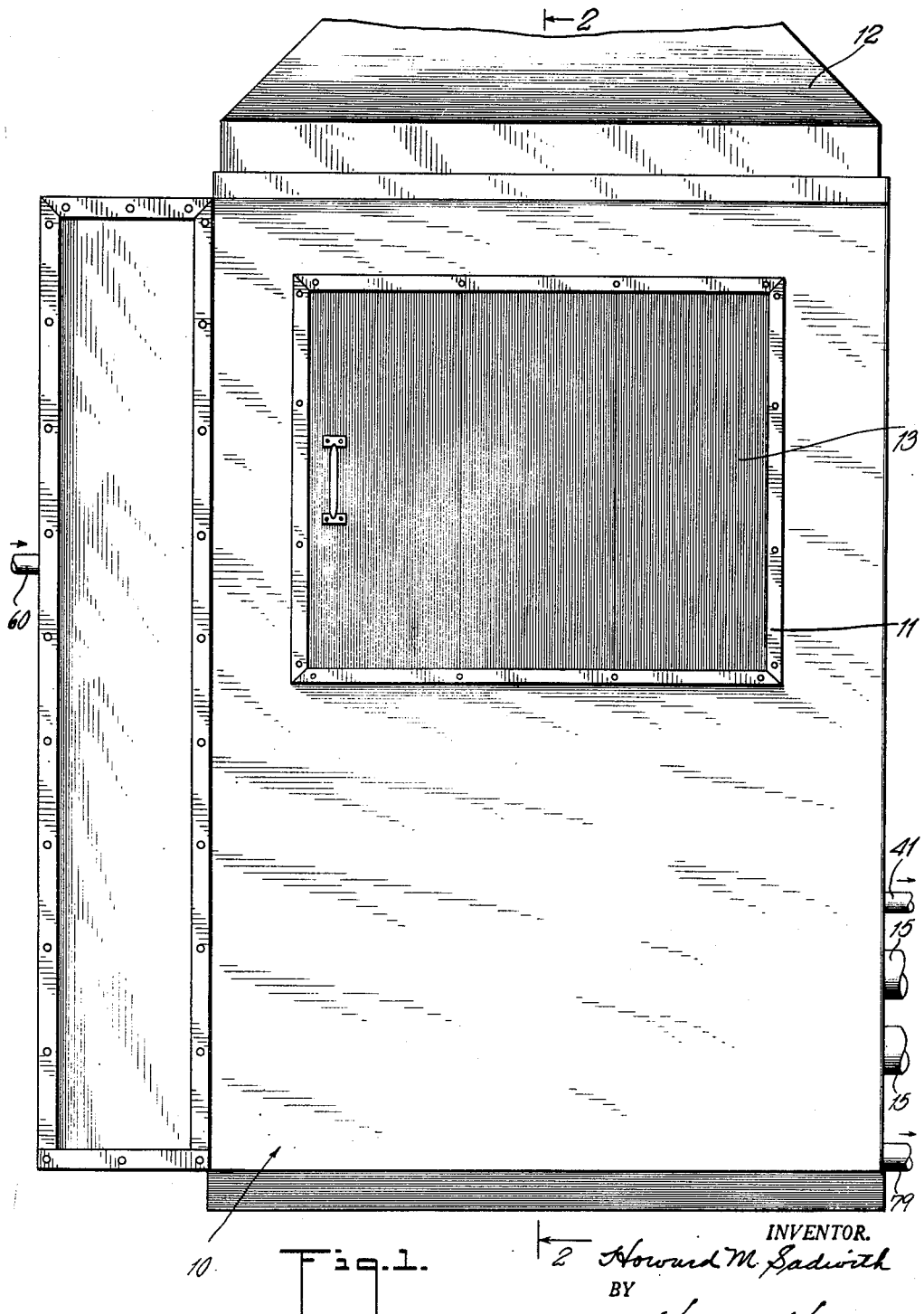
Fig. 1 is a front elevation of a washing machine embodying the invention.

The various parts of the devices are contained in a housing 10 (Fig. 1) having a lower portion 10a and an upper portion 10b with one wall of the upper portion 10b being set back from the corresponding wall of the lower portion 10a. The upper portion 10b has a loading and unloading opening 11 in the wall opposite the set-back wall and a vent duct 12 leads from the top of the housing. A three-panel sliding door 13 is supported on rails 13a for movement into and out of position to close the aperture 11. The lower portion of the housing contains a tank 14 for receiving a supply of washing liquid and within the tank is provided a coil of pipe 15 through which a suitable heating medium may be circulated for the purpose of heating the washing liquid.

Figure 2:
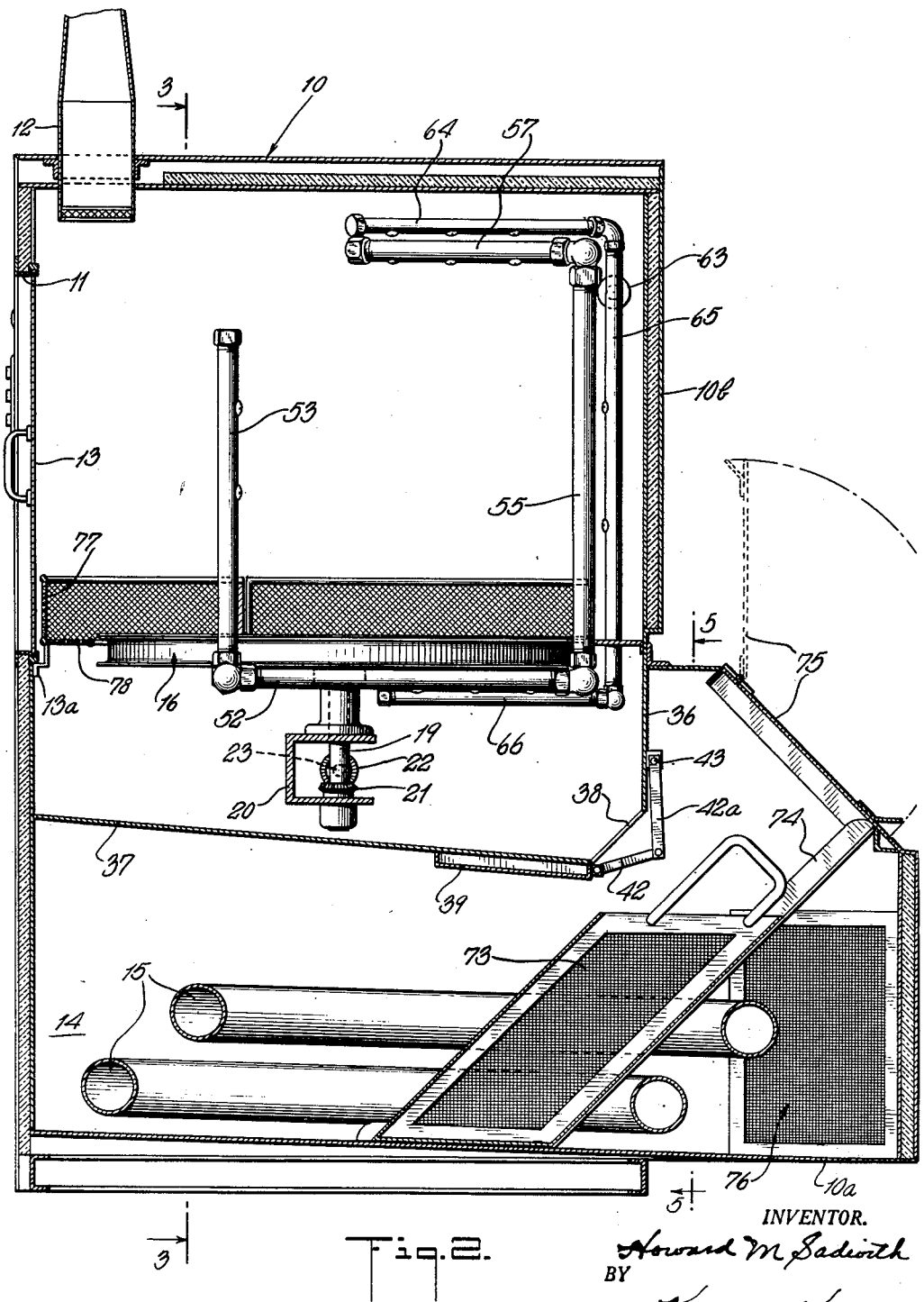
Fig. 2 is a vertical section substantially on the line 2—2 of Fig. 1.
Figure 3:
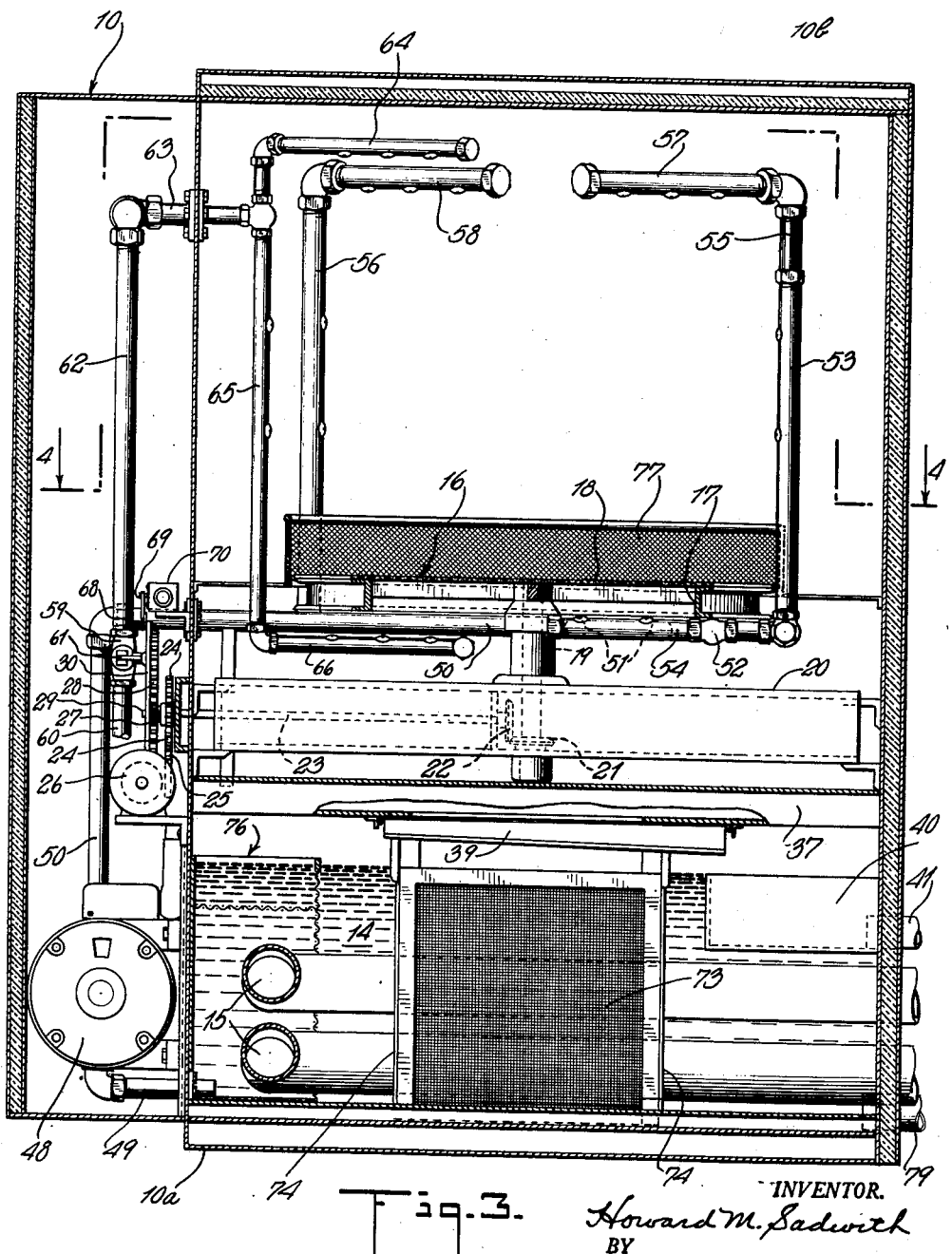
Fig. 3 is a vertical section substantially on the line 3—3 of Fig. 2.

At approximately the level of the bottom of the aperture 11, there is provided a rotating platform 16 (Figs. 2, 3 and 4) composed of an annular channel member 17 and a disk 18 of large aperture wire mesh supported thereby. The platform 16 is driven by a shaft 19 journalled in a frame 20 extending between and supported by opposite walls of the lower housing portion 10a. The shaft 19 carries a bevel gear 21 which meshes with a bevel gear 22 fixed to a shaft 23 journalled in the frame 20. To the shaft 23 is fixed a gear 24 which meshes with a gear 25 fixed to the output shaft of a motor reducer unit 26 (Figs. 3 and 4). A gear 27 also fixed to the shaft 23 meshes with a gear 28 of much larger diameter mounted on a shaft 29 supported by the housing wall. A circular plate or cam 30 (Figs. 6 and 7) is attached to the gear 28 and is provided with two pins 31 and 32 of which 32 is shorter and arranged at a greater radial distance from the axis of rotation than 31. The plate or cam 30 is so shaped as to form an arcuate portion 33 of one diameter and an arcuate portion 34 of a larger diameter with a sloping surface 35a interjoining said two arcuate surfaces at one set of ends thereof and a radial shoulder 35b interjoining the remaining ends of said arcuate surfaces.

A vertical partition 36 in the nature of an extension of the set-back wall of the upper housing portion 10b projects a short distance into the lower housing portion 10a and a transverse slightly slanting partition 37 is arranged in the housing portion 10a below the frame 20 and cooperates with the partition 36 to form a receptacle for collecting liquid sprayed into the upper housing portion 10b by means subsequently to be described. The meeting edges of the partitions 36 and 37 are cut away for a short distance centrally of the housing portion 10a to provide an outlet 38. A trough 39 closed at one end and open at its other end is slidably attached to the partition 37 in such manner that it can be moved into and out of position to underlie the outlet 38. A basin 40 is supported by one wall of the housing 10 below the open end of the trough 39, the bottom of which slopes downwardly toward its open end. A pipe 41 leads from the basin 40 through the housing wall for the purpose of draining the basin 40.

The trough 39 is connected by links 42 to the free ends of arms 42a carried by a suitable horizontal shaft 43. An arm 44 fixed to the shaft 43 has its outer end connected by a link 44a to one end of a lever 45 pivotally mounted on a stud 45a supported by the casing wall and having its remaining end overlying the cam 30. The arrangement of the lever 45 is such that it projects into the path of the pin 31 under conditions later to be described, but lies out of the path of the pin 32 at all times. A second lever 46 pivotally mounted on a stud 46a supported by the casing wall in horizontal alinement with the stud 45a and the lever 46 has a pin and slot connection 47 with the lever 45 and also overlies the cam 30. The arrangement of the lever 46 is such that it lies out of the path of the pin 31 at all times but under conditions later to be described it projects into the path of the pin 32. By operation of the lever 45 as will be subsequently described, the trough 39 is moved into and out of position to underlie the outlet 38. When the trough 39 underlies the outlet 38, liquid flowing through the outlet 38 is delivered to the basin 40 and is carried out of the housing through the pipe 41. When the trough 39 is out of underlying position to the outlet 38, liquid flowing through said outlet discharges into the tank 14.

A pump 48 has an inlet pipe 49 communicating with the bottom of the tank 14 and has an outlet pipe 50 leading into the housing below the platform 16. Two nozzle equipped branch pipes 51 lead from the pipe 50 beneath the platform 16 with the nozzles directed upwardly. A branch pipe 52 leads from the pipe 50 below the platform 16 and terminates in a vertical nozzle equipped riser 53, the nozzles of which are directed inwardly of the platform 16. A nozzle equipped branch pipe 54 leads from the pipe 52 inwardly beneath the platform 16 with its nozzles directed upwardly. Risers 55 and 56 having inwardly directed nozzles extend from the pipe 50 and have sections 57 and 58 overlying the platform 16 with downwardly directed nozzles. Operation of the pump 48 withdraws liquid from the tank 14 and projects it against articles supported by the platform 16.

The housing 10 supports a valve 59 to which leads a pipe 60 of a water-supply system. The valve 59 is of the self-closing type and is provided with a movable arm 61, by means of which the valve may be opened. A pipe 62 leads from the valve 59 to a pipe 63 extending through the housing wall. From the pipe 63 a pipe 64 extends over the platform 16 while a pipe 65 extends downwardly and terminates in a section 66 underlying the platform 16. The pipe 64 is provided with downwardly directed nozzles while the vertical pipe section 65 is provided with inwardly directed nozzles and the horizontal pipe section 66 is provided with upwardly directed nozzles for the purpose of spraying water into engagement with articles supported by the platform 16.

The cam member 30 is provided with a flat end projection 67 for engagement with the end of the lever 61 and is also provided at its periphery with an oblique projection 68. The projection 68 is adapted to swing the arm 69 of a self-closing switch 70 which is included in the locking circuit of a manually-operated solenoid-controlled switch (not shown) for the motor unit 26. The periphery of the cam 30 is engaged by the free end of the arm 71 of a self-opening switch 72 in circuit with the pump 48 motor. The arrangement is such that the pump motor circuit is open when the switch arm 71 engages the surface 33 and is closed when the switch arm 71 engages the surface 34 and the switch for the motor 26 after being manually closed remains closed until released to open condition by operation of the arm 69 to open the switch 70. Rotation of the cam 30 actuates the lever 45 to move the trough 39 between a position in which it underlies the aperture 38 and in a position in which it does not underlie said aperture. Engagement of the projection 67 with the arm 61 temporarily opens the valve 59.

In the operation of the washing machine above described, articles to be washed are placed on the platform 16 with the platform at rest, the door 13 in open position, the valve 59 closed and the pump 48 inoperative, the cam 30 being in the position shown in Fig. 7. The trough 39 is out of underlying position with respect to the outlet 38 and the pin 31 is either engaged with or is just slightly beyond the end of the lever 45, while the lever 46 projects into the path of the pin 32. After the door is closed, the starting switch is operated, thereby closing the energizing circuit of the motor unit 26 and this switch is held closed by operation of its solenoid until actuation of the arm 69, later to be described. Rotation of the shaft 23 causes rotation of the platform 16 and also causes rotation of the cam 30. A slight rotation of the cam 30 engages the surface 35a with the switch arm 71 to swing it sufficiently to close the pump motor circuit whereupon liquid is drawn from the bottom of the tank 14 and discharged through the nozzles in the pipe sections 51, 53, 54, 55, 56, 57 and 58 into engagement with the articles on the platform 16. Liquid is returned from the liquid-collecting receptacle through the outlet 38 to the tank 14.

After approximately a half rotation of the cam 30, the switch arm 71 drops over the shoulder 35b from the high portion 34 to the low portion 33, thereby opening the pump motor circuit to discontinue the supply of wash liquid. Shortly after the discontinuance of the washing liquid supply, the pin 32 engages the end of the lever 46 to rotate said lever clockwise, thereby causing counterclockwise rotation of the lever 45, both levers moving from the position shown in Fig. 7 to the position shown in Fig. 8, in which position the lever 45 projects into the path of the pin 31. Counterclockwise rotation of the lever 45 causes clockwise rotation of the arm 44, thereby drawing the trough 39 into underlying relation to the outlet 38. After shifting of the trough 39 has been completed, the projection 67 engages the operating lever 61 of the valve 59 to open the valve and supply fresh rinse water to the articles on the platform through the pipes 64, 65 and 66. Further rotation of the cam 30 releases the arm 61 from the projection 67 to shut off the rinse water. Following the shutting off of the rinse water, the pin 31 engages the lever 45 to return it and the lever 46 to the position shown in Fig. 7, thereby returning the trough 39 to its Fig. 7 position in which it is out of underlying position to the outlet 38. The trough is retained in its underlying position to the outlet 38 a sufficient length of time after the valve 59 is closed to permit all the rinse water to be discharged into the basin 40. Finally, the projection 68 engages the switch arm 69 to open circuit the solenoid of the starting switch which opens, thereby de-energizing the motor unit 26 and bringing the machine to rest with the various parts in the position shown in Fig. 7. The washed and rinsed articles are removed from the platform 16 and the machine is again ready to receive a new charge of articles to be washed.

An open-top generally box-shape strainer 73 is slidably supported in the lower housing portion 10a by a frame 74 in position to receive liquid discharged through the outlet 38 when the trough 39 is out of underlying position with respect to the outlet. The housing portion 10a is provided with an opening through which the strainer 73 may be removed and a door 75 is provided for closing said opening. A strainer cage 76 is provided in the lower housing portion 10a to screen the liquid flowing into the pipe 49. An annular guard 77 is provided around the platform 16 and a wire mesh stationary table 78 extends from the bottom of the opening 11 to the guard 77. A drain pipe 79 leads from the bottom of the tank 14.

I claim:

1. In combination in a washing machine, a rotatable holder for objects to be washed first with wash liquid and then with rinse liquid, means for applying said liquids to said objects while said holder is rotated, means for rotating said holder, a source of said wash liquid and a receptacle therefor, a source of said rinse liquid and a receptacle therefor, means for guiding liquids falling from said objects including movable directing means adapted in a first position to direct said falling liquids to one of said receptacles and in a second position to the other, wash liquid supply means operable when actuated to supply wash liquid from said source thereof to said first mentioned means, rinse liquid supply means operable when actuated to supply rinse liquid from said source thereof to said first mentioned means, a rotatable circular cam member synchronized with the rotation of said holder, actuating devices interconnecting said cam member with said wash and rinse liquid supply means and said movable directing means, said cam member and actuating devices being so constructed and arranged as to actuate said wash liquid supply means and move said directing means to one of said positions while deactuating said rinse liquid supply means, and to actuate said rinse liquid supply means and move said directing means to the other of said positions while deactuating said wash liquid supply means, the actuating device interconnecting said rotatable member and movable directing means comprising a pair of different length pins projecting from the side of said rotatable cam member and positioned at different radial distances from the axis of rotation thereof, a first pivoted lever having an end projectable into the path of one of said pins only, a linkage connecting said lever to said movable directing means, and a second pivoted lever having at one end a connection with said first lever and having its other end projectable into the path of the remaining pin only, said levers being so actuated through their connection that at any time only one of said projectable ends is located in the path of one of said pins and upon rotation of either of said levers by the corresponding pin, its projectable end is moved out of the path of that pin and the projectable end of the other lever is moved into the path of its corresponding pin.

2. In combination in a washing machine, a rotatable holder for objects to be sprayed first with wash liquid and then with rinse liquid, spray means for applying said liquids to said objects while said holder is rotated, means for rotating said holder, a source of said wash liquid, a source of said rinse liquid, a drain, means for guiding liquids falling from said objects including movable directing means adapted in a first position to direct said falling liquids to said source of wash liquid and in a second position to said drain, wash liquid supply means operable when actuated to withdraw wash liquid from said source thereof and supply it to said spray means, rinse liquid supply means operable when actuated to supply rinse liquid from said source thereof to said spray means, a cam synchronized with the rotation of said holder, actuating devices interconnecting said cam with said wash and rinse liquid supply means and said movable directing means, said cam and actuating devices being so constructed and arranged as to actuate said wash liquid supply means and move said directing means to said first position while deactuating said rinse liquid supply means, and to actuate said rinse liquid supply means and move said directing means to said second position while deactuating said wash liquid supply means, the actuating device interconnecting said cam and movable directing means comprising a pair of different length pins projecting from the side of said cam and positioned at different radial distances from the axis of rotation thereof, a first pivoted lever having an end projectable into the path of one of said pins only, a linkage connecting said lever to said movable directing means, and a second pivoted lever having at one end a connection with said first lever and having its other end projectable into the path of the remaining pin only, said levers being so actuated through their connection that at any time only one of said projectable ends is located in the path of one of said pins and upon rotation of either of said levers by the corresponding pin, its projectable end is moved out of the path of that pin and the projectable end of the other lever is moved into the path of its corresponding pin.

3. In combination in a washing machine, a rotatable table adapted to receive objects to be sprayed first with wash liquid and then with rinse liquid, sprayer means for applying said liquids to said objects while said table is rotated, means for rotating said table, a tank under said table for said wash liquid, a source of rinse liquid, a drain, means for guiding liquids falling from said objects including movable directing means adapted in a first position to permit wash liquid falling from said objects to return to said tank and in a second position to direct rinse liquid falling from said objects to said drain, a wash liquid supply pump operable when actuated to withdraw said wash liquid from said tank and supply it to said sprayer means, rinse liquid supply means including a valve operable when opened to permit flow of rinse liquid from said source thereof to said sprayer means, a cam synchronized with the rotation of said table, actuating devices controlled by said cam and operable thereby to control said pump, said valve and said directing means, said cam and actuating devices being so constructed and arranged that at a predetermined time during the rotation of said cam said directing means is moved to said first position and said pump is actuated shortly thereafter, said valve being closed, and after a predetermined amount of rotation of said cam said pump is deactuated, said directing means is moved to said second position and said valve is opened shortly thereafter and for a predetermined time, the actuating device interconnecting said cam and movable directing means comprising a pair of different length pins projecting from the side of said cam parallel to and at different radial distances from the axis of rotation thereof, a first pivoted lever having an end projectable into the path of one of said pins only, a linkage connecting said lever to said movable directing means, and a second pivoted lever having at one end a connection with said first lever and having its other end projectable into the path of the remaining pin only, said levers being so actuated through their connection that at any time only one of said projectable ends is located in the path of either of said pins and upon rotation of one of said levers by the corresponding pin its projectable end is moved out of the path of that pin and the projectable end of the other lever is moved into the path of its corresponding pin.

4. In combination in a washing machine, a rotatable table adapted to support objects to be sprayed first with wash liquid and then with rinse liquid, sprayer means for applying said liquids to said objects while said table is rotated, means for rotating said table, a tank under said table for said wash liquid, a source of rinse liquid, a drain, a receptacle for liquids falling from said objects under said table and having an outlet, movable directing means adapted in a first position to permit wash liquid falling from said outlet to fall to said tank and in a second position to direct rinse liquid falling from said outlet to said drain, a wash liquid supply pump operable when actuated to withdraw said wash liquid from said tank and supply it to said sprayer means, rinse liquid supply means including a valve operable when opened to permit flow of rinse liquid from said source thereof to said sprayer means, a cam synchronized with the rotation of said table, actuating devices controlled by said cam and operable thereby to control said pump said valve and said directing means, said cam and actuating devices being so constructed and arranged that at a predetermined time during the rotation of said cam said directing means is moved to said first position and said pump is actuated shortly thereafter, said valve being closed; and after a predetermined amount of rotation of said cam said pump is deactuated, said directing means is moved to said second position and said valve is opened shortly thereafter and for a predetermined time, the actuating device interconnecting said cam and movable directing means comprising a pair of different length pins projecting from the side of said cam parallel to and at different radial distances from the axis of rotation thereof, a first pivoted lever having an end projectable into the path of one of said pins only, a linkage connecting said lever to said movable directing means, and a second pivoted lever having at one end a connection with said first lever and having its other end projectable into the path of the remaining pin only, said levers being so actuated through their connection that at any time only one of said projectable ends is located in the path of one of said pins and upon rotation of either of said levers by the corresponding pin, its projectable end is moved out of the path of that pin and the projectable end of the other lever is moved into the path of its corresponding pin.

HOWARD M. SADWITH.

REFERENCES CITED

The following references are of record in the file of this patent:

UNITED STATES PATENTS

| Number | Name | Date |
| --- | --- | --- |
| 206,832 | Schroder et al. | Aug. 6, 1878 |
| 236,144 | Clark | Jan. 4, 1881 |
| 1,147,164 | Haggerty et al. | July 20, 1915 |
| 1,399,978 | Monaghan | Dec. 13, 1921 |
| 1,447,304 | Hauk | Mar. 6, 1923 |
| 1,662,496 | Forsgard | Mar. 13, 1928 |
| 1,941,660 | Collins | Jan. 2, 1934 |
| 2,025,592 | Kelly | Dec. 24, 1935 |